W. H. HACKNEY.
GOLD SAVING APPARATUS.
APPLICATION FILED DEC. 28, 1908.
962,636.
Patented June 28, 1910.
2 SHEETS—SHEET 1.
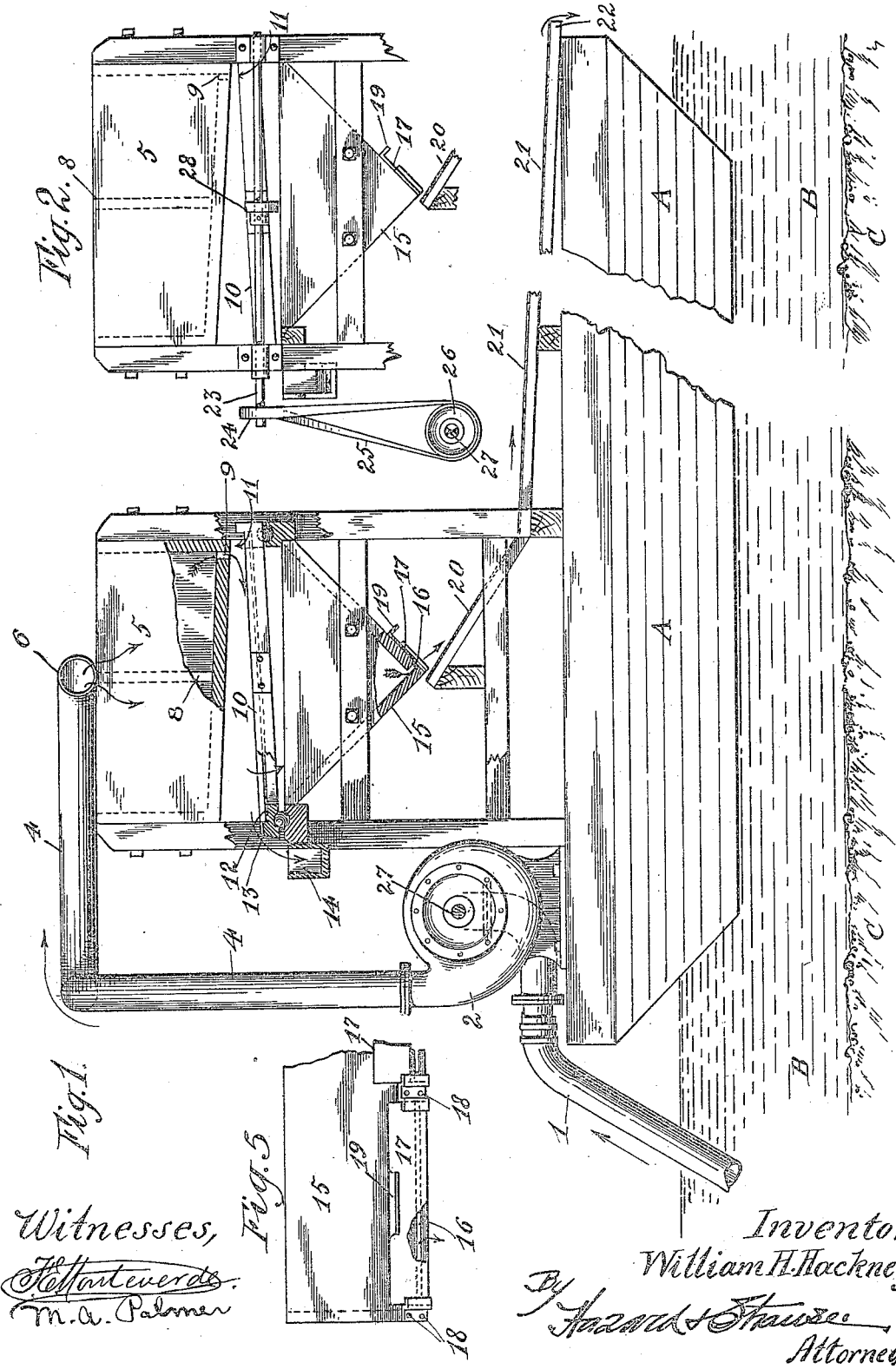
Witnesses
Inventor,
William H. Hackney
Attorneys,

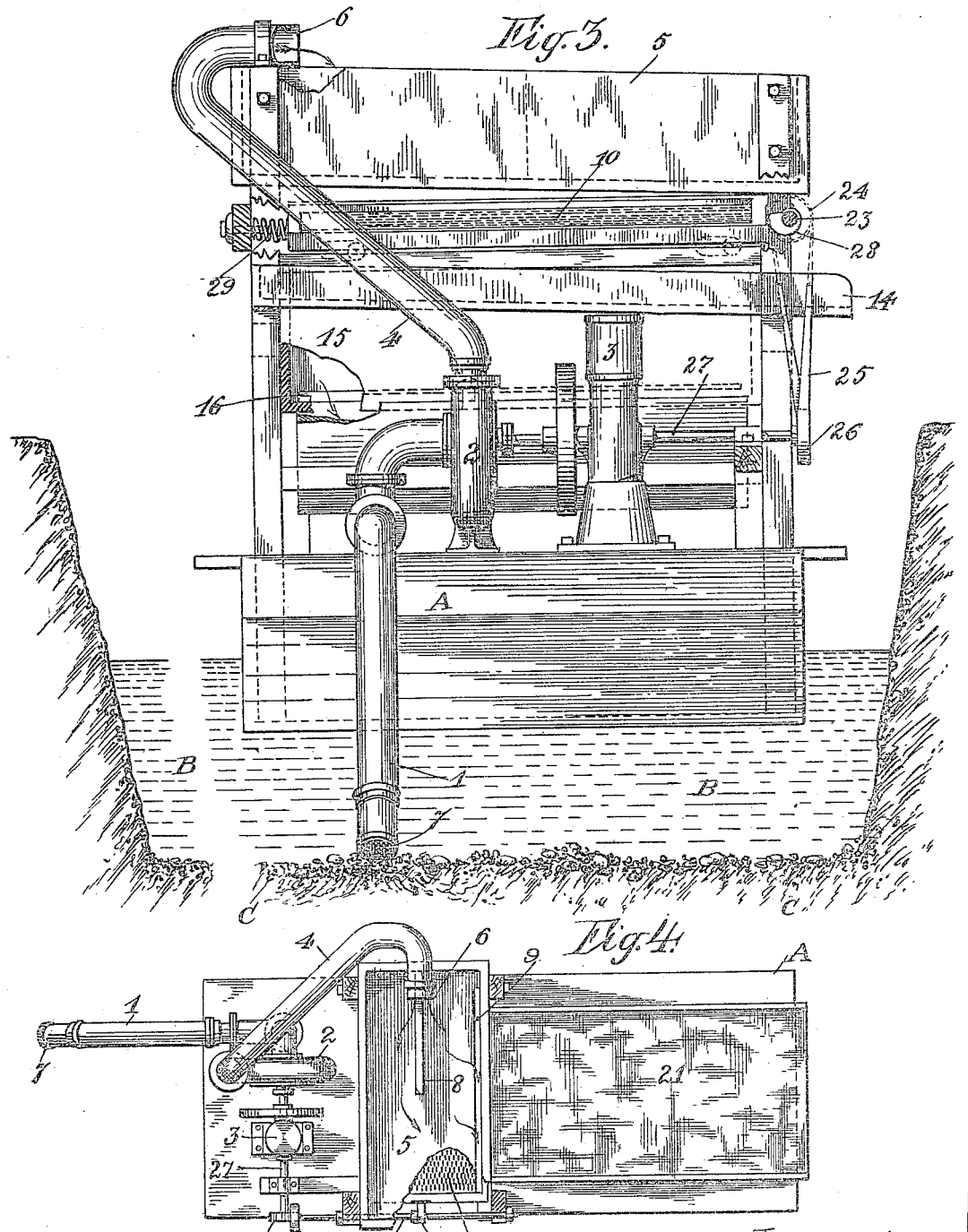

UNITED STATES PATENT OFFICE.

WILLIAM H. HACKNEY, OF NATIONAL SOLDIERS HOME, CALIFORNIA.

GOLD-SAVING APPARATUS.

962,636.　　　　Specification of Letters Patent.　　Patented June 28, 1910.

Application filed December 23, 1908. Serial No. 469,610.

*To all whom it may concern:*

Be it known that I, WILLIAM H. HACKNEY, a citizen of the United States, residing at the National Soldiers Home, in the county of Los Angeles and State of California, have invented new and useful Improvements in Gold-Saving Apparatus, of which the following is a specification.

My invention relates to that class of gold separators adapted for use in situations where it is desired to separate fine gold or foreign substances where water covers the gold carrying gravel or debris, and is more particularly adapted for use in running streams where fine gold is found in the gravel and dirt in the bottom of the stream; and it is of the objects of my invention to provide a portable separator that can be readily moved from place to place or along up and down the stream. I accomplish this object by means of the apparatus described herein and shown in the accompanying drawings, in which:—

Figure 1— is a side elevation of my gold separator, parts broken away. Fig. 2— is a fragmentary view of the apparatus showing the agitator. Fig. 3— is a front elevation. Fig. 4— is a plan view partly broken away. Fig. 5— is a detail partly broken away of means to adjust the discharge opening.

I have shown my improved separator mounted on the float A in the water B, at the bottom of which is the sand, gravel and sediment C which carries the fine gold to be extracted therefrom.

Referring to Figs. 1 and 3, the gravel or loose earth, clay or other substance carrying gold or other precious metal is sucked up through the suction pipe 1 and is carried into the centrifugal pump 2. Motion is imparted to this pump by means of the engine 3 and water passes out of the pump through the discharge pipe 4 passing thence into the distributing tank 5 through the discharge nozzle 6. Covering the opening at the discharge nozzle 6 I have provided a screen 7, the purpose of which is to prevent passing therethrough particles of earth or rock too large to pass through the opening herein described in the machine. The gold with the sand, gravel and water is discharged into the distributing tank 5 on either side of a baffle partition 8 which projects partly across the face of the distributing tank. This distributing tank is provided with an inclined bottom, the inclination of which is in the direction of the longitudinal discharge port 9 through which the substance operated on passes onto oscillating screen 10. This screen has an inclination downwardly from the point 11 immediately under the discharge opening 9 where the substance is received, which passes thence along the inclined face of said screen to the bottom 12 thereof. At this point the particles too large to pass through the mesh in the oscillating screen will pass over the ledge 13 and into the discharge trough 14 and pass thence out of the machine into the water in which the separator is stationed, the finer particles including all particles of gold will pass through the oscillating screen into the longitudinal V-shaped trough 15 and pass out at the bottom thereof through the discharge port 16.

To properly distribute the substance passing through the apparatus I have provided an adjustable cover 17 for placement along and over the discharge opening 16. This cover is provided with means to increase and decrease the width of the discharge opening 16 by means of set screws 18, a handle 19 being provided to hold the cover in any desired position while regulating the opening to the port 16. The substance operated upon passing out through the slotted port 16 drops upon the amalgam plate 20, the inclination of which will carry the particles not adhering to the plate down upon the burlap 21 and thence downward over the inclined burlap table and be discharged (less particles adhering to the burlap) into the water as at 22.

To operate the oscillating screen 10 I have provided the counter-shaft 23 carrying driven pulley 24 keyed thereto. This pulley is rotated by the belt 25 passing over the pulley 26 keyed upon the driving shaft 27. This counter-shaft carries a cam 28 which is keyed thereon, on the rotation of which will together with the action of the coiled spring 29 impart an oscillating motion to the oscillating screen 10.

Having described my invention what I claim as new and desire to secure by Letters Patent is:—

1. In apparatus of the class described, in combination, a distributing tank having a longitudinally extending outlet, means for directing a current of water carrying the gold in a direction extending longitudinally of said outlet, a baffle adapted to divide said current and affording means for guiding a portion thereof toward the remote part of said outlet, and separating means receiving the gold bearing current beyond said outlet.

2. In apparatus of the class described, in combination, a distributing tank having a baffle wall and having an outlet below the level of said wall, means for directing a current of water carrying the gold along said baffle so that said baffle divides said current and guides a portion of said current along the interior of said tank and a gold separator receiving the gold bearing current after passing said outlet, said tank having a bottom inclined transversely to said baffle.

3. In apparatus of the class described, in combination, a distributing tank having an inclined bottom, said bottom having a slot at the lower part thereof extending longitudinally of said tank, a baffle wall extending longitudinally of said tank, means for delivering a current of water carrying the gold in a direction longitudinally of said baffle wall so that said baffle wall divides said current, said baffle affording means for directing the uppermost of said currents toward the remote end of said tank, a gold separator and means for directing the current from said outlet on to said amalgamating plate.

In witness that I claim the foregoing I have hereunto subscribed my name this 19th day of December, 1908.

W. H. HACKNEY.

Witnesses:
HENRY T. HAZARD,
EDMUND A. STRAUSE.